Figure 1:
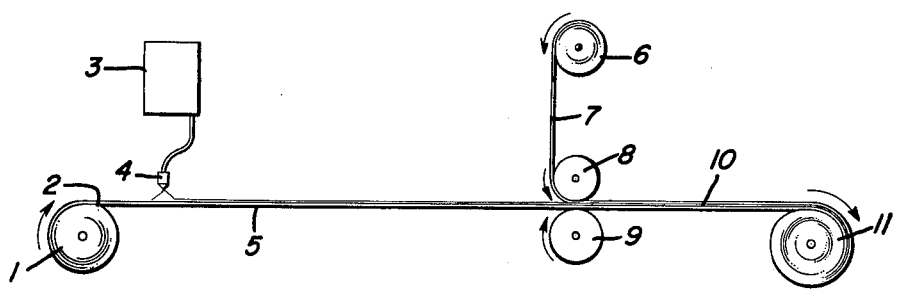

Nov. 2, 1965     C. J. BENNING ETAL     3,215,580

COATING AND LAMINATING PROCESS

Filed June 25, 1964

Frank X. Werber
Calvin J. Benning
INVENTORS

BY
Attorney 3,215,580
COATING AND LAMINATING PROCESS
Calvin J. Benning, Clarksville, and Frank X. Werber, Rockville, Md., assignors to W. R. Grace & Co., New York, N.Y., a corporation of Connecticut
Filed June 25, 1964, Ser. No. 377,807
11 Claims. (Cl. 156—332)

The present invention relates to a novel and useful laminating and coating process. More particularly it is directed to a laminating and coating process involving an in situ polymerization of the adhesive or coating.

This application is a continuation-in-part of application having Serial No. 245,974, filed December 20, 1962, now abandoned which in turn is a continuation-in-part of application having Serial No. 69,273, filed November 15, 1960, and now abandoned.

It is an object of the present invention to provide a process for coating various substrates with a liquid vinyl monomer composition. Another object of this invention is to provide a process for forming a laminate in situ for various substances using a polymerized vinyl monomer composition as the adhesive. Other objects will become apparent from reading hereinafter.

In accordance with this invention the coating process is performed by coating a solid substrate with a composition consisting essentially of a liquid vinyl monomer and an aluminum alkyl compound which composition on exposure to free oxygen, e.g., air, forms a solid polymeric coating in situ on the substrate.

The laminating process is accomplished by the present invention by applying to at least one surface of each pair of surfaces to be adhered, an adhesive consisting essentially of a liquid vinyl monomer and an aluminum alkyl compound, exposing said adhesive to free oxygen, e.g., air, thus initiating polymerization of the vinyl monomer, bringing together the surfaces to be adhered and pressing the resultant product to effect adhesion.

In a preferred embodiment of the present invention, the liquid vinyl monomer is an acrylic acid ester, methacrylic acid ester or vinyl alkanoate such as vinyl acetate and vinyl propionate.

The coating or laminating process of the instant invention is carried out at temperatures ranging from room temperatures, i.e. 20° C., up to either the melting point of the substrate or the boiling point of the vinyl monomer employed, whichever is lower. Even temperatures lower than room temperatures, e.g., 0° C. are operable, however, it is preferred that the process be carried out at temperatures in the range 20–40° C.

The vinyl composition is ordinarily applied by spraying on the substrate or layer to be coated or laminated. The vinyl monomer is premixed with the aluminum alkyl in an oxygen free atmosphere. For example, the vinyl monomer and the aluminum alkyl compound can be added to an oxygen-free aerosol container and when ready for use can be sprayed onto the substrate to be coated or laminated. The catalyst system causing the polymerization of the vinyl monomer consists essentially of an aluminum alkyl compound and free oxygen. When the vinyl monomer composition containing the aluminum alkyl catalyst component is exposed to oxygen the polymerization proceeds at an extremely rapid rate. The coating of the vinyl monomer becomes tacky in about 0.1 to 60 seconds. For the vinyl monomer coating or laminate to become completely dry it is necessary to wait about 12 to 24 hours.

In the lamination process the amount of pressure needed to cause adhesion between the layers is nominal. Pressures in the range of 1 to 500 p.s.i. are operable.

The vinyl monomer composition is applied as a coating or laminate in thicknesses ranging from 0.001 to 20 mils. Preferably the coating is applied as thin as possible. A preferred thickness range is 0.001 to 1.0 mil.

The substrates on which this coating or laminating process is operable are many and varied. For purposes of this invention any substrate having an excess electron density, i.e., electrons present in excess of those required for forming the chemical bonds of the substrate is operable to be coated or laminated by the process of the instant invention. Examples of various types of substrates include, but are not limited to, paper, textiles, metals such as aluminum foil, wood, siliceous materials, plastics such as polyethylene, polypropylene, cellophane, polystyrene, polyvinyl acetate, polyvinyl chloride, oxidized polyethylene, polyvinylidene chloride, and the like.

The term "liquid" used in conjunction with the vinyl monomers herein means that the monomer is not a gas or a solid under standard conditions of temperature and pressure. Thus the vinyl monomers are liquid. The term "vinyl monomers" herein means compounds of the formula

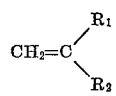

wherein $R_1$ is hydrogen or an organic radical and $R_2$ is an organic radical. The vinyl monomers are well known in the art and include such material as acrylic acid esters, vinyl esters, allyl esters, vinyl nitriles, vinyl ethers and the like. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed isomers); n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1 - dihydroheptafluorobutyl acrylate, N,N - dimethylaminoethyl acrylate; 2-N-morpholinoethyl acrylate and tetrahydrofurfuryl acrylate.

Other suitable vinyl monomers include: abitol methacrylate; acrylamide; acrylonitrile; acrylyl chloride; allyl acetic acid; allylidene diacetate; allyl acetate; N-allyl acrylamide; allyl beta-allylox ropionate; allylamine; N-allyl aniline; allyl anthranilate; allylbenzene; allyl benzoate; allyl bromide; allyl n-butyrate; allyl carbamate; allyl chloride; allyl chloroacetate; allyl cinnamate; allyl crotonate; allyl cyanide; allyl ether; allyl 2-ethylbutyrate; allyl ethyl ether; allyl glycol ether; allyl n-heptanoate; allyl hexoate; allyl n-hexyl ether; allyl isocyanate; allyl laurate; allyl methacrylamide; allyl methacrylate; allyl myristate; allyl octanoate; allyl palmitate; allyl pelargonate; allyl phenoxyacetate; allyl phenyl acetate; allyl phenyl ether; allyl propionate; allyl stearate; allyl trifluoroacetate; allylurea; allyl n-valerate; allyl iso-valerate; n-amyl methacrylate; iso-amyl methacrylate; benzyl methacrylate; 2-bromoethyl methacrylate; 2,2-butoxyethyl methacrylate; N-tert-butylacrylamide; sec-butyl methacrylate; iso-butyl methacrylate; tert-butyl methacrylate; 2-chloroethyl methacrylate; N-(para-chlorophenyl) - acrylamide; N - (para-chloro-phenyl)-methacrylamide; 2-chlorostyrene; 3-chlorostyrene; 4-chlorostyrene; cinnamyl methacrylate; beta-cyanoethyl methacrylate; cyclohexyl methacrylate; cyclopentyl methacrylate; 9-decenyl isocyanate; n-decyl methacrylate; N,N-diallylacrylamide; diallyl adipate; diglycolate; diallyl malonate; N,N-diallyl methacrylamide; diallyl phthalate; 2,5-dichlorostyrene; N,N-diethylacrylamide; N,N-diethylaminoethyl methacrylate; 1,1 - dihydroheptaflurobutyl methacrylate; N,N - dimethylallylamine; N,N - dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; n-lauryl methacrylate; lauryl methacrylate; methacrylamide; methallyl chloride; 3-methoxybutyl methacrylate; 2-methoxyethyl methacrylate; methyl methacrylate; alpha-methylsytrene; N-(beta-naphthyl) methacrylamide; octadecyl methacrylate; iso-propyl methacrylate; styrene; tetraethyleneglycol dimethacrylate; 3,3,5-trimethylcyclohexyl methacrylate; 3,5,5 - trimethylhexyl methacrylate; vinyl acetate; vinyl n-butyl ether; vinyl isobutyl ether; vinyl butyrate; vinyl 2-chloroethyl ether vinyl isobutyl ether; vinyl butyrate; vinyl 2-chloroethyl ether; vinyl n-decanoate; vinyl ethylether; vinyl 2-ethylhexoate; vinyl 2-ethylhexyl ether; vinyl iodide; vinyl laurate; vinyl methacrylate; vinyl 2-methoxyethyl ether; vinyl n-octanoate; vinyl oleate; vinyl phenylacetate; vinyl propionate and vinyl stearate. The monomers may be used individually or in various combinations. Many others are known in the art and may likewise be used.

By the term "aluminum alkyl compounds" as used throughout this invention is meant a compound having the general formula:

in which R is alkyl (e.g., methyl, ethyl, propyl, isopropyl, butyl, isobutyl, etc., including octyl, dodecyl, and so on; R' is H, or alkyl; and R" is either H or alkyl. Among the various aluminum alkyl compounds which may be employed are triethyl aluminum; triethyl aluminum/diethyl aluminum hydride mixtures; triisobutyl aluminum; trimethyl aluminum; trioctyl aluminum; tri-n-butyl aluminum; triisopropyl aluminum; tridocecyl aluminum; diethyl methyl aluminum; diethyl isobutyl aluminum; diisobutyl ethyl aluminum; diethyl aluminum hydride; diisobutyl aluminum hydride; dioctyl aluminum hydride and the like. The alkyl aluminum compounds may be employed individually or in various mixtures.

The amount of aluminum alkyl is not critical. As little as 0.01 weight percent is operable, and as much as 25% based on the weight of the vinyl monomer can be used. Amounts of the lower aluminum alkyls in excess of 25% are hazardous to use because of the inflammability of the aluminum alkyl at such concentrations. Even concentrations of the lower alkyls in the range of 10–25%, though operable, have a tendency to smoke. Expressed in mole percents, aluminum alkyl concentrations of 0.005–25 mole percent (of the monomer) are generally operable, the range of 0.01–10 mole percent being preferred. Even smaller amounts than 0.005 mole percent are operable, but are not recommended because the polymerization rate may be slowed to the point where a material part of the monomer, if volatile (e.g., vinyl acetate), may be lost by evaporation during the polymerization of the monomer into a film.

The following examples illustrate without limiting the invention.

EXAMPLE 1

100 ml. of n-butyl acrylate monomer were admixed with 10.5 ml. of diisobutyl aluminum hydride and charged to a conventional oxygen-free 200 ml. aerosol aluminum container under nitrogen. The container was pressurized with nitrogen to 30 p.s.i.g. 0.25 ml. of the n-butyl acrylate-diisobutyl aluminum hydride composition was sprayed rapidly and uniformly on a substrate consisting of a 6" x 6" sheet of kraft paper held flat on a glass plate in air to form a coating of about 0.5 mil thickness of polymerizate. In 5.0 seconds the polymer coating was tacky. After 24 hours a clear adherent poly-n-butyl acrylate coating covered the paper.

EXAMPLE 2

Example 1 was repeated using 6" x 6" panels, sheets, films or swatches of the following substrate materials: plywood, white pine, aluminum foil, aluminum sheeting, 316 stainless steel, cellophane, glass plate, nylon, cotton, wool, "Dacron" type polyester, polyvinyl chloride, polyvinyl acetate, polyvinylidene chloride, polystyrene, oxidized polyethylene common brick, and cinder block. In all cases a clear adherent poly-n-butyl acrylate coating on the substrate resulted within 24 hours.

EXAMPLE 3

Example 1 was repeated except that the vinyl monomer in the aerosol container was 100 ml. of 2-ethylhexyl acrylate and the aluminum alkyl compound was 9.45 ml. triisobutyl aluminum under 30 p.s.i.g. nitrogen pressure. 0.25 ml. of the acrylate composition was sprayed onto a 6" x 6" piece of each of the following substrate materials: kraft paper, plywood, aluminum foil, aluminum sheeting, 316 stainless steel, cellophane, glass plate, nylon, cotton, wool, "Dacron" type polyester, polyvinyl chloride, polyvinyl acetate, polyvinylidene chloride, polystyrene, oxidized polyethylene common brick and cinder block while exposed to the atmosphere. In all instances the coating became tacky within 2–10 seconds and resulted in a clear, dry, adherent coating of 2-ethylhexyl acrylate polymer on the substrates after 24 hours.

EXAMPLE 4

Example 1 was repeated using the following vinyl monomer-aluminum alkyl compositions on kraft paper. The results are reported in Table I.

*Table I*

| Monomer | Aluminum Alkyl Compound | Weight Ratio Monomer: Aluminum Alkyl Compound | Tackiness (seconds) | Coating Results | |
|---|---|---|---|---|---|
| | | | | Dry (hours) | Remarks |
| Methyl acrylate | Triisobutyl aluminum | 5:1 | 20 | 24 | Clear, adherent coating. |
| Ethyl acrylate | do | 5.8:1 | 15 | 22 | Do. |
| n-Butyl acrylate | do | 7.4:1 | 5 | 20 | Do. |
| Tridecyl acrylate | do | 14.7:1 | 2 | 18 | Do. |
| Methyl acrylate | Diisobutyl aluminum hybride | 6.3:1 | 20 | 24 | Do. |
| Ethyl acrylate | do | 7.4:1 | 16 | 22 | Do. |
| 2-ethylhexyl acrylate | do | 13.5:1 | 5 | 19 | Do. |
| Tridecyl acrylate | do | 18.8:1 | 2 | 18 | Do. |

EXAMPLE 5

Example 1 was repeated using a conventional cleansing tissue as the substrate. The coating (thickness 0.05 mil) was tacky within 5 seconds and resulted in a clear dry adherent n-butyl acrylate polymer coating in 16 hours.

EXAMPLE 6

Our experiments have shown that thickness can be added to the monomer mixture to give a coating of greater thickness, which is due to the increased viscosity of the monomer mixture. As a thickener, a minor was allowed to stand 24 hours in order to obtain a dried polymer film coating.

Percent conversion was calculated as follows:

$$\text{Percent conversion} = \frac{\text{wt. of polymer film}}{\text{wt. of monomer sprayed}} \times 100$$

*Table II*

| Monomer | Aluminum Alkyl Compound | Mole Ratio Monomer: Aluminum Alkyl Compound | Weight Monomer Sprayed (gms.) | Weight Polymer Film (gms.) | Percent Conversion to Polymer | Coating Results |
| --- | --- | --- | --- | --- | --- | --- |
| Vinyl Acetate | Triisobutyl Aluminum | 11.5:1 | 1.52 | 0.162 | 10.6 | Clear, adherent coating. |
| Vinyl Propionate | do | 11.5:1 | 1.43 | 0.121 | 8.4 | Do. |
| Vinyl Butyrate | do | 11.5:1 | 1.83 | 0.210 | 11.5 | Do. |
| Vinyl 2-ethyl Hexoate | do | 11.5:1 | 1.98 | 0.132 | 6.7 | Do. |
| Vinyl n-butyl Ether | do | 11.5:1 | 1.24 | 0.055 | 4.4 | Do. |
| Vinyl 2-chloroethyl Ether | do | 11.5:1 | 1.27 | 0.087 | 6.8 | Do. |
| Vinyl 2-methoxyethyl Ether | do | 11.5:1 | 1.25 | 0.051 | 4.1 | Do. |
| Allyl Acetate | do | 11.5:1 | 1.37 | 0.056 | 4.1 | Do. |
| Isopropenyl Acetate | do | 11.5:1 | 1.18 | 0.131 | 11.1 | Do. |
| Di-n-butyl Itaconate | do | 11.5:1 | 1.76 | 0.321 | 18.2 | Do. |
| Acrylonitrile | do | 11.5:1 | 1.40 | 0.051 | 3.6 | Do. | amount, e.g., 1–10% by weight of a polymer of the monomer can be dispersed in the monomer mixture. For example, 2% of polyvinylacetate can be added to a vinyl acetate monomer. Instead of, or in addition to, polymer of the monomer, thickeners such as the following can be added to the monomer mixture before or after the addition of the aluminum trialkyl: polmethylmethacrylate, polyvinylalcohol, polyvinylchloride, casein, polystyrene, natural algin, natural or synthetic rubber, polyvinylbutyral, polyvinylpropionate and any other polymer soluble in the monomer.

EXAMPLE 7

The invention is operable to give films of copolymers of vinyl acetate monomer with other polymerizable monomers, e.g., butyl acrylate, as shown in this example. Butyl acrylate was spread out as a thin film on a pane of glass. Then a thin film of a vinyl acetate: triethyl aluminum composition (10.5:1 wt. ratio), was sprayed from an aerosol bomb on the butyl acrylate film. In about 1 hour the resulting film was dry to touch, and within another 5 hours was difficult to scratch with the fingernail. Part of the film was removed from the glass with a razor blade, and it was evident that no butyl acrylate monomer remained as a liquid substrate.

EXAMPLE 8

One mole of vinyl acetate, one mole of vinyl propionate, and 0.06 mole of aluminum triethyl were mixed together under nitrogen, and 100 cc. of the mixture put in an aerosol bomb, with 50 cc. of butane, which serves as both solvent and propellant. It was sprayed on aluminum sheet and allowed to stand overnight. A clear hard coating resulted.

It appears that water does not affect the film-forming polymerization. In a preferred embodiment of the invention, the film is formed on water or on aqueous solutions.

EXAMPLE 9

The following examples in Table II shows some of the various vinyl monomers which are operable in the practice of this invention. In each example in Table II the monomer was charged under nitrogen to a 100 ml. tared aerosol bomb. The bomb was cooled to minus 20° C. in a Dry Ice-acetone bath and the aluminum alkyl compound was added thereto under nitrogen. The bomb was then sealed, pressured to 30 p.s.i. with nitrogen, removed from the bath and re-weighed. A portion of the contents of the bomb was sprayed onto a tared glass plate in air until a thin film covered the plate. The plate It has been shown that solvents can be used in the monomer mixture (cf. butane in Example 8). The invention is broadly operable without a solvent, but there are some cases in which better results are obtained when a solvent is used, for example, when a substantial amount of thickness is used in monomer-alkyl mixture. Also, a solvent can be used when it is desired to retard polymerization of the mixture after exposure to air, or when it is desired to reduce volatilization of a fairly volatile monomer. When a solvent is used, it should of course, be inert to the other components of the mixture. The liquid hydrocarbons are preferred, e.g., butane, pentane, hexane, cyclohexane, heptane, octane, benzene, toluene, xylene, and the like. The amount of solvent is not critical, and can be for example, 10 to 90% by weight of the total monomer mixture.

The discovery that the vinyl monomers plus the aluminum alkyl compound in the substantial absence of oxygen can be stored for long periods of time without polymerization in situ is of utmost importance in the commercial use of the invention, since closed containers of mixture of the two materials (with or without accelerators, solvents, thickeners, pigments, etc.) can be kept on the shelf until used, and, when used, need merely be applied as a film by brush, spray, dipping or any other conventional film-forming means. Contact with oxygen in the air will then polymerize the monomer mixture in situ. In this sense, the monomer mixture can be applied to form coatings in the same way as paints, varnishes, lacquers, and enamels.

The film of this invention presents marked difference over the polyvinyl films already known, and the differences are greater, the greater the porosity of the substrate on which the instant film is formed. The reason for this is that the polymerization of this invention takes place in three dimensions, as will be described. If the surface is substantially flat, e.g., glass or metal, there will nevertheless be some surface porosity, perhaps of the order of magnitude of several square centimeters or more per square centimeter of gross flat surface, and these surface pores and irregularities are filled in to a degree that is impossible when applying prepolymerized vinyl films. The polymer formed in situ by the polymerization of this invention on highly porous surfaces is even more marked in its differences from the preformed polymer applied to the same surface. In paper and cloth, for example, the polymer formed in place shows an intricate three-dimensional network of polymer molecules through the cross-section of the material, as compared to a simple planar matting or felting of polymer molecules when preformed polymer is put on the same surface. In porous materials of the nature of masonry (brick, cinder block, etc.), the in situ polymerization of this invention permits a much greater penetration of product into the surface. The pores are thus filled in, not merely covered up, and thus closed to moisture seepage from both sides of the surface. In coating a porous surface, even though oxygen from the outside air may be substantially shut out by the surface film first formed, it appears that a substantial part of the deeper polymerization within the pores is induced by oxygen molecules present as "vapor layers" within the pore walls.

Fillers, dyes and pigments which do not react with the monomer mixture prior to exposing it to air or oxygen can be added to the composition prior to use within the scope of this invention.

Figure 2:
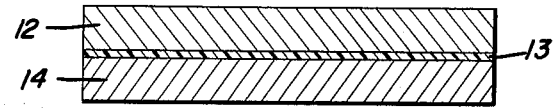

In regard to laminating by the instant invention, reference is made to FIGURE 1 which is a schematic elevation of apparatus used to manufacture laminated materials in accordance with the process of the instant invention, and FIGURE 2 which is a cross-sectional view of the laminated materials.

Referring to FIGURE 1 of the drawing, the laminate may be manufactured from two separate feeder rolls 1 and 6, synchronized to feed at the same speed. The materials to be laminated using the vinyl adhesive can be selected from various classes. Thus it is possible to laminate paper or other cellulosic material, aluminum or other metal foil, various plastics such as polypropylene, oxidized polyethylene, polystyrene, polyvinyl chloride, polyvinylidene chloride, polyester film such as "Mylar," cellulose esters such as cellulose acetate and cellulose acetate butyrate and the like. The above materials can be laminated to themselves or to each other. For example, feeder roll 1 can unwind aluminum foil 2 and feeder roll 6 can unwind kraft paper 7. The vinyl monomer-aluminum alkyl adhesive composition maintained in an oxygen-free atmosphere under nitrogen pressure in container 3 is sprayed through spray nozzle 4 onto the surface of the aluminum foil while it is exposed to atmospheric conditions. The distance between the point where the adhesive composition is sprayed onto the substrate and the variable pressure nip rolls 8 and 9 whereat the layers are adhered depends on several variables, e.g., the speed of the substrate, the thickness of the adhesive coating the vinyl monomers used as the adhesive, etc. Thus if the substrate is traveling at a fast rate, it is necessary to increase the distance between the point of application of the adhesive composition and the nip rolls in order to insure that the adhesive polymerizes to the point of being tacky when it contacts the surface of the other layer being adhered thereto just prior to entering the nip rolls. In the same way, a thicker adhesive coating will require application at a greater distance from the nip rolls. However, the distance can be determined empirically by one skilled in the art knowing that the adhesive must be tacky when it contacts the surface of the other layer being adhered thereto just prior to entering the nip rolls. Where two different materials are being laminated together, the vinyl monomer adhesive composition is preferably, but not necessarily, applied to the material having the least porosity and the most uniform surface. This is to insure that a smooth coating is obtained and not one which, due to the uneven or porous surface of the substrate, results in a non-uniform coating.

The surface of the aluminum foil coated with the tacky vinyl composition is contacted with the surface of the kraft paper to be adhered thereto, just prior to entering the nip rolls. The nip rolls can be maintained at various pressures ranging from 1.0 to 50 pounds/linear inch. A minimum amount of pressure is necessary to perform the instant invention and is mainly used to squeeze out any air that may be entrapped between the layers. The thus laminated material 10, is collected on a take up roll 11.

FIGURE 2 shows a cross-sectional view of the laminated layers 12 and 14 with the vinyl adhesive 13 therebetween. In the example where kraft paper is laminated to aluminum foil, the resultant product has low porosity due to the aluminum foil and is receptive of printing due to the paper.

The following example shows the operability of the instant invention in a laminating process. One advantage of the laminating process of this invention is that the adhering step does not require the addition of heat to seal the layers. This insures that the plastic layers being laminated are not heat distorted or wrinkled during lamination. In addition since there is no heating to effect adhesion there is no necessity of a subsequent cooling or chilling step which also may cause distortion of the laminate.

EXAMPLE 10

Aluminum foil (0.5 mil thick x 12 inches wide) fed at a rate of 5 ft./sec. from a feeder roll was sprayed in the atmosphere uniformly on one surface with a nitrogen pressurized oxygen-free composition of n-butyl acrylate monomer containing 5% by wt. of triisobutyl aluminum until a 0.1 ml. adhesive coating on the aluminum foil surface resulted. After traveling 50 feet the tacky adhesive coated surface of the aluminum foil was contacted with one surface of kraft paper (1.0 mil thick x 12 inches wide) fed at a rate of 5 ft./sec. from a separate feeder roll and the resulting laminate was immediately passed through a set of nip rolls maintained at 5 pounds/linear inch to cement the laminate. The resultant laminate was collected on a take up roll. The lamination process was performed at 25° C. at atmospheric pressure. After 24 hours the laminated material could not be pulled apart manually.

The adhesive action of the vinyl polymer in the instant invention is due to mechanical adhesion and does not depend on any specific chemical interaction between the vinyl adhesive and any element of the surface of the material to be coated or laminated. For purposes of this invention a polarity interaction is not considered a chemical interaction but is considered to be a mechanical adhesion.

What is claimed is:

1. The process of coating a substrate having an excess electron density, i.e., electrons present in excess of those required for forming the chemical bonds of the substrate which comprises applying to a surface of said substrate a coating composition consisting essentially of a liquid vinyl monomer of the formula

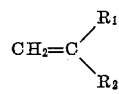

wherein $R_1$ is a member of the group consisting of hydrogen and an organic radical and $R_2$ is an organic radical and 0.01 to 25% by weight of said vinyl monomer of an aluminum alkyl compound of the formula

wherein R is a member of the group consisting of alkyl and H and R' is an alkyl, all of said alkyls containing 1 to 8 carbon atoms, said composition being maintained under oxygen-free conditions prior to application and exposing said coating to free oxygen at ambient conditions to form a solid polymeric vinyl coating in situ on the substrate.

2. The process of laminating substrates having an excess electron density, i.e., electrons present in excess of those required for forming the chemical bonds of the substrates which comprises applying to at least one surface of each pair of substrate surfaces to be adhered under atmospheric conditions, a coating composition consisting essentially of a liquid vinyl monomer of the formula

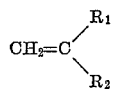

wherein $R_1$ is a member of the group consisting of hydrogen and an organic radical and $R_2$ is an organic radical and 0.01 to 25% by weight of said vinyl monomer of an aluminum alkyl compound of the formula

wherein R is a member of the group consisting of alkyl and H and R' is an alkyl, all of said alkyls containing 1 to 8 carbon atoms, said composition being maintained under oxygen free conditions prior to application, exposing said coating composition to free-oxygen at ambient conditions thus initiating polymerization of the vinyl monomer, allowing said polymerization to continue until the coating is tacky, contacting the surfaces of the substrates to be adhered and pressing the resultant laminate at a pressure of 1 to 500 p.s.i. to effect adhesion.

3. The process according to claim 1 wherein the vinyl monomer is an acrylic acid ester.

4. The process according to claim 3 wherein the acrylic acid ester is a member of the group consisting of n-butyl acrylate, t-butyl acrylate, 2-ethylhexyl acrylate, ethyl acrylate, methyl acrylate and tridecyl acrylate.

5. The process according to claim 1 wherein the vinyl monomer is a vinyl alkanoate.

6. The process according to claim 5 wherein the vinyl alkanoate is a member of the group consisting of vinyl acetate and vinyl propionate.

7. The process according to claim 2 wherein the vinyl monomer is an acrylic acid ester.

8. The process according to claim 7 wherein the acrylic acid ester is a member of the group consisting of n-butyl acrylate, t-butyl acrylate, 2-ethylhexyl acrylate, ethyl acrylate, methyl acrylate and tridecyl acrylate.

9. The process according to claim 2 wherein the vinyl monomer is a vinyl alkanoate.

10. The process according to claim 9 wherein the vinyl alkanoate is a member of the group consisting of vinyl acetate and vinyl propionate.

11. The process according to claim 2 wherein one substrate is aluminum foil and the other is kraft paper.

References Cited by the Examiner
UNITED STATES PATENTS

| | | | |
|---|---|---|---|
| 2,226,589 | 12/40 | Smyers | 161—216 X |
| 2,580,050 | 12/51 | Sparks | 161—249 X |
| 2,706,699 | 4/55 | Plansoen et al. | 156—332 X |
| 2,827,447 | 3/58 | Nowlin et al. | 260—683.15 |
| 2,859,200 | 11/58 | Lappala | 156—322 X |
| 2,958,686 | 11/60 | Dunham et al. | 161—249 X |
| 3,117,112 | 1/64 | Mirabile et al. | 260—88.7 |

FOREIGN PATENTS

| | | |
|---|---|---|
| 584,857 | 1/47 | Great Britain. |
| 819,291 | 9/59 | Great Britain. |

EARL M. BERGERT, *Primary Examiner.*